United States Patent [19]

Fleck et al.

[11] 3,926,969
[45] Dec. 16, 1975

[54] TRIAZOLE-BIS(BENZOXAZOLE) OPTICAL BRIGHTENERS

[75] Inventors: Fritz Fleck, Bottmingen; Horst Schmid, Munchenstein; Salvatore Valenti, Bottmingen, all of Switzerland

[73] Assignee: Sandoz Ltd., Basel, Switzerland

[22] Filed: Nov. 19, 1973

[21] Appl. No.: 417,373

[30] Foreign Application Priority Data
Nov. 24, 1972 Switzerland.................. 17180/72
Dec. 18, 1972 Switzerland.................. 18381/72

[52] U.S. Cl..... 260/240.1; 117/33.5 R; 117/33.5 T; 252/301.2 W; 252/301.3 W; 260/240 C; 260/240 D; 260/308 A; 260/307 D
[51] Int. Cl.²......................................... C07D 413/14
[58] Field of Search......... 260/240.1, 240 D, 240 C, 260/240 CA

[56] References Cited
UNITED STATES PATENTS
3,412,089  11/1968  Ohkawa et al. .............. 260/240 CA
3,456,217  12/1970  Siegrist et al................... 260/240 B FOREIGN PATENTS OR APPLICATIONS
1,273,487  5/1972  United Kingdom............ 260/240 C
2,213,895  10/1972  Germany
2,066,252  8/1971  France OTHER PUBLICATIONS
Tanaka, Chem. Abstract, 66 (1967), No. 105897.

Primary Examiner—Arthur P. Demers
Attorney, Agent, or Firm—Gerald D. Sharkin; Richard E. Vila; Joseph J. Borovian

[57] ABSTRACT

The present invention relates to compounds of formula I,

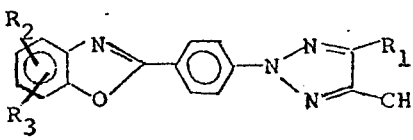

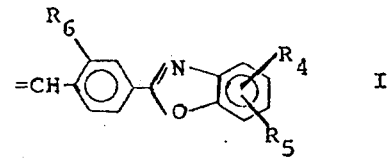

in which $R_1$ signifies a hydrogen or chlorine atom or a $(C_{1-6})$ alkyl radical,
each of $R_2$ and $R_4$, which may be the same or different, signifies a hydrogen or a chlorine atom, a cyano group, a $(C_{1-12})$ alkyl, phenyl, phenyl $(C_{1-6})$ alkyl, benzyloxy, phenoxy, $(C_{1-6})$ alkoxy or a naphthotriazolyl-2 radical, and
each of $R_3$ and $R_5$, which may be the same or different, signifies a hydrogen atom, a cyano group or a $(C_{1-12})$ alkyl or $(C_{1-6})$ alkoxy radical,
or,
$R_2$ and $R_3$ together, and/or
$R_4$ and $R_5$ together, form a benzene ring, and
$R_6$ signifies a hydrogen atom or a cyano group,
which compounds are useful as optical brighteners.

26 Claims, No Drawings

TRIAZOLE-BIS(BENZOXAZOLE) OPTICAL BRIGHTENERS

IMPROVEMENTS IN OR RELATING TO ORGANIC COMPOUNDS

The present invention relates to bisbenzoxazolyl derivatives.

Accordingly, the present invention provides compounds of formula I,

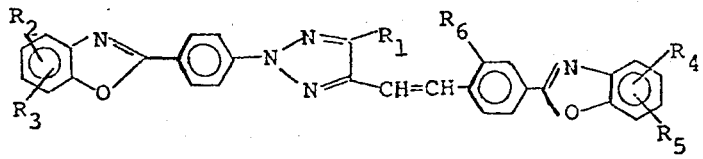

in which $R_1$ signifies a hydrogen or chlorine atom or a $(C_{1-6})$ alkyl radical, each of $R_2$ and $R_4$, which may be the same or different, signifies a hydrogen or a chlorine atom, a cyano group, a $(C_{1-12})$ alkyl, phenyl, phenyl $(C_{1-6})$ alkyl, benzyloxy, phenoxy, $(C_{1-6})$ alkoxy or a naphthotriazolyl-2 radical, and each of $R_3$ and $R_5$, which may be the same or different, signifies a hydrogen atom, a cyano group or a $(C_{1-12})$ alkyl or $(C_{1-6})$ alkoxy radical, or, $R_2$ and $R_3$ together, and/or
$R_4$ and $R_5$ together, form a benzene ring, and
$R_6$ signifies a hydrogen atom or a cyano group.

In the compounds of formula I, where $R_1$ is an alkyl radical, such alkyl radical is preferably linear and contains 1 to 6 carbon atoms, more preferably of 1 to 4 carbon atoms, e.g., methyl, ethyl, n-propyl, and n-butyl. Most preferred significances for $R_1$ are, however, hydrogen or methyl.

Suitable alkyl radicals for the substituents $R_2$, $R_3$, $R_4$ and $R_5$ include straight or branched-chain alkyl radicals of 1 to 12, preferably 1 to 8 carbon atoms, e.g., methyl, ethyl, n- or iso-propyl, n-, iso-, sec. or tert. butyl, n-, iso-, sec. or tert.amyl, n-hexyl, 2-ethyl-hexyl, n-octyl, tert. octyl, n-decyl, n-dodecyl, tert. dodecyl. More preferred alkyl radicals contain 1 to 4 carbon atoms, e.g. methyl, ethyl, n-propyl, iso-propyl, n-butyl, iso-butyl, or tert. butyl, most preferably methyl.

Where $R_2$ and/or $R_4$ signifies a phenylalkyl radical, the alkyl moiety contains 1 to 6, preferably 1 to 4 carbon atoms, examples of preferred phenylalkyl radicals include benzyl, phenylethyl or cumyl.

Where any of $R_2$ to $R_5$ signifies an alkoxy radical such alkoxy radical contains 1 to 6, preferably 1 to 4, carbon atoms, e.g., methoxy, ethoxy, propoxy, butoxy.

Preferred compounds of formula I, are those where each of $R_2$ and $R_4$, which may be the same or different signifies an alkyl radical of 1 to 8 carbon atoms, an alkoxy radical of 1 to 3 carbon atoms, a phenyl radical, a cyano group or a naphthotriazolyl-2 radical.

Still more preferred compounds are those where i. each of $R_2$ to $R_5$ which may be the same or different, signifies a hydrogen atom, a $(C_{1-8})$ alkyl radical, [preferably $(C_{1-4})$] or a cyano group;

ii. one of $R_2$ and $R_3$ and one of $R_4$ and $R_5$ signifies a cyano, $(C_{1-8})$, preferably $(C_{1-4})$, alkyl, or $(C_{1-4})$, preferably $(C_{1-3})$, alkoxy and the remaining $R_2$ to $R_5$ substituents are hydrogen;

iii. one of $R_2$ and $R_3$ and one of $R_4$ and $R_5$ signifies a $(C_{1-8})$, preferably a $(C_{1-4})$, alkyl radical and the remaining $R_2$ to $R_5$ substituents signify a $(C_{1-4})$, preferably $(C_{1-3})$, alkoxy radical.

Especially preferred compounds are those where $R_2$ and $R_4$, and $R_3$ and $R_5$, respectively, have the same significance.

Where the benzoxazol ring is monosubstituted such substituent is preferably in the 5 or 6- position, especially where the substituent is alkoxy or cyano. Where it is di-substituted the substituents are preferably in the 4- or 6- positions, especially where the substituents are cyano.

The invention also provides a process for the production of compounds of formula I, as defined above, which comprises a. condensing a compound of formula XX,

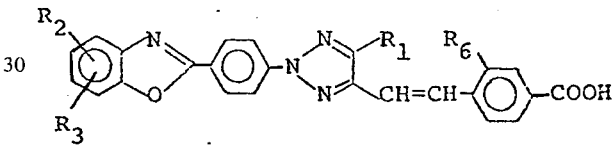

or a functional derivative thereof, in which $R_1$, $R_2$, $R_3$ and $R_6$ are as defined above, with a compound of formula IV,

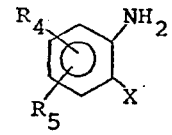

in which $R_4$ and $R_5$ are as defined above, and
X signifies a halogen atom or a hydroxy group, b. reacting a compound of formula XXI,

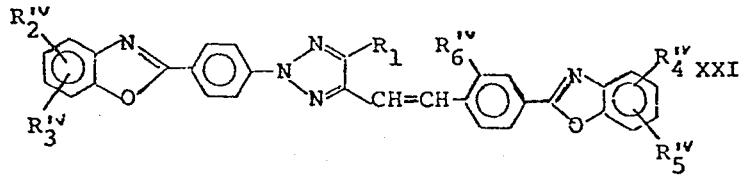

in which $R_1$ is as defined above and each of $R_2{}^{iv}$, $R_3{}^{iv}$, $R_4{}^{iv}$, $R_5{}^{iv}$ and $R_6{}^{iv}$ has the same significance as $R_2$, $R_3$, $R_4$, $R_5$ and $R_6$, respectively, as defined above, or signifies a bromine atom, with the proviso that at least one of $R_2{}^{iv}$, $R_3{}^{iv}$, $R_4{}^{iv}$, $R_5{}^{iv}$ and $R_6{}^{iv}$ signifies a bromine atom, with CuCN, to obtain a compound of formula I in which at least one of $R_2$ to $R_6$ signifies a cyano group, c. condensing a dicarboxylic acid of formula II,

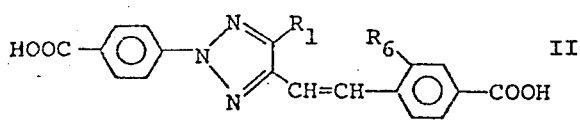

or a functional derivative thereof,
in which $R_1$ and $R_6$ are as defined above, with a compound of formula III,

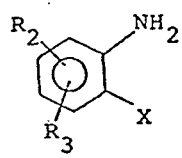

in which $R_2$, $R_3$ and X are as defined above, and a compound of formula IV, as defined above, or
d. reacting a compound of formula V,

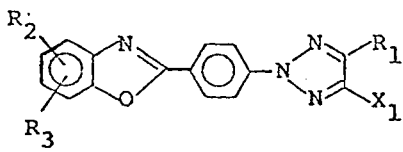

with a compound of formula VI,

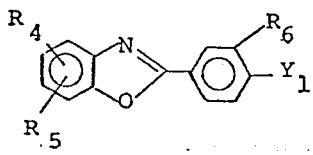

in which $R_1$, $R_2$, $R_3$, $R_4$, $R_5$ and $R_6$ are as defined above,
one of $X_1$ and $Y_1$ signifies a —CHO group or a functional derivative thereof, and
the other $X_1$ or $Y_1$ signifies a —CH$_2$Z$_1$ group group, in which $Z_1$ signifies a hydrogen atom, a carboxyl, a (C$_{1-4}$) alkoxycarbonyl or cyano group or a group of formula

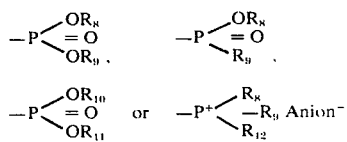

in which each of $R_8$, $R_9$ and $R_{12}$, which may be the same or different, signifies an unsubstituted or substituted aryl radical,
each of $R_{10}$ and $R_{11}$, which may be the same or different, signifies an unsubstituted alkyl radical, a cycloalkyl radical of 5 to 7 carbon atoms or an alkyl radical substituted by a (C$_{1-4}$) alkoxy, phenyl or phenoxy group,
and the anion ⁻ is a monovalent anion, preferably Cl⁻, Br⁻, I⁻, CH$_3$—O—SO$_3$⁻, C$_2$H$_5$O—SO$_3$⁻ or CH$_3$—SO$_3$⁻, and, where required, converting into a hydrogen atom, and $Z_1$ in the resulting product which is other than a hydrogen atom.

Process a) and process c), where X is hydroxy, may be carried out according to conventional methods. Suitably, the reaction is carried out in the presence of an acid condensation agent. The reaction may be carried out at a temperature in the range of from 50° to 350°C, preferably 100° to 300°C, particularly 150° to 250°C. The reaction is preferably carried out in the presence of an organic solvent in an inert gas atmosphere e.g., nitrogen. Suitably the reactants are brought together at the lower end of the temperature range and the cyclisation process may be concluded at a higher temperature. The cyclisation temperature will in each case depend on the condensation agent employed, e.g., when polyphosphoric acids are employed in quantities exceeding the stoichiometric amount the temperature is at least 100°C.

As examples of suitable acid condensation agents may be given, boric acid, boric oxide, boron trifluoride, zinc chloride, polyphosphoric acids, aromatic or aliphatic sulphonic acids, e.g., benzene-, 4-methyl-benzene-, methane- or ethane-sulphonic acid.

When the reaction is carried out in the presence of boric acid, zinc chloride or the said sulphonic acids as condensation agents then these are advantageously employed in catalytic quantities, i.e., in amounts of 0.5 – 10% in relation to the combined weight of the reaction components. When smaller quantities, e.g., 0.1% are used the speed of the reaction is perceptibly lower, whereas amounts exceeding 10% do not result in any significant improvement.

The organic solvents employed are preferably inert, high-boiling solvents such as ortho-dichlorobenzene, trichlorobenzene, nitrobenzene, di-ethyl-, di-n-butyl- or di-octylphthalate, di- or tri-ethylene glycol, di- or tri-propylene glycol, di-ethyleneglycoldiethyl ether or -dibutyl ether, diphenyl, diphenyl oxide, tetrahydronaphthalene, trimethyl-, triethyl-, tetramethyl- and tetraethyl benzene, tetramethylene sulphone or mixtures of such solvents.

When dicarboxylic acids of formula II are employed as such, it is advisable to add 0.1 to 1 equivalent of a nitrous base per carboxy group, such as aliphatic amines (trimethylamine, triethylamine, tri-n-butyl-amine, tri-iso-butylamine), N,N-dialkylaminobenzenes (N,N-dimethylamino- or N,N-diethylaminobenzene), heterocyclic amines (pyridine, the methylpyridines, quinoline, isoquinoline, pyridine base mixtures, N-methyl-, N-ethyl-, N-n-butylpiperidine). Preferred are pyridine and pyridine base mixtures.

Acylation of the dicarboxylic acids of formula II or their functional derivatives with 1-amino-2-halogen benzenes of formulae III and IV, respectively, is effected in a method analogous to the one for o-aminophenols.

Cyclisation is carried out according to known methods, e.g., in the presence of copper or a copper compound. The reaction is suitably carried out at temperatures of 100°–200°C. A liquid reaction medium, optionally in the presence of an acid binding agent, is advantageous. The copper catalyst may be a commercial copper powder or preferably evenly distributed copper obtained by a reaction of blue lead or zinc with a cupric compound such as cupric acetate, chloride or sulphate. As examples of copper compounds may be given cupric compounds such as cupric oxide, chloride, bromide, acetate or sulphate, but also cuprous compounds such as cuprous chloride. Suitable reaction media are for example inert organic solvents, such as optionally halogenated or nitrated hydrocarbons, high-boiling petrol fractionation products, xylene mixture, chlorobenzene, ortho-dichlorobenzene, trichlorobenzene, nitrobenzene, bromobenzene, naphthalene, tetrahydronaphthalene, decahydronaphthalene, diphenyl, diphenyl oxide, ethers such as methoxy- or ethoxy-benzene, bis-(2- ethoxyethyl)-ether, bis-(n-butoxyethyl)-ether, bis-[2-(2'-methoxyethoxy)-ethyl]-ether, bis-[2-(2'-ethoxy-ethoxy)-ethyl]-ether, bis-[2-(2'-n-butoxyethoxy)-ethyl]-ether, amides such as dimethyl formamide, dimethylacetamide, phosphoric acid-tris-(dimethylamide), sulphones such as tetramethylenesulphone.

Preferred examples of acid binding agents for the neutralization of free hydrochloric or hydrobromic acid are alkaline metallic salts of weak organic or inorganic acids such as sodium or potassium acetate, sodium or potassium carbonate and particularly amines, e.g., of the aliphatic series such as n-butylamine, di-(n-butyl)-amine, tri-(n-butyl)-amine, triethylamine, of the aliphatic-aromatic series such as dimethylamino- or diethylaminobenzene, or of the heterocyclic series such as pyridine, guinoline, pyridine base mixtures, picolines and lutidines. If tertiary amines are employed in a great excess, they may simultaneously serve as solvents or reaction media, respectively, and as acid binding agents.

The reaction may also be effected using a complex salt, e.g., from a copper compound and ammonia or pyridine such as cuprammonium acetate or a cupripyridinium-sulphate instead of an acid binding agent.

When an inorganic acid binding agent or when no acid binding agent is employed, cyclisation takes place at temperatures ranging from 150° to 200°C, whereas the temperature range is 100° to 150°C in the presence of a basic organic substance such as pyridine.

For the production of compounds of formula I according to process c) in which both benzoxazolyl rings are substituted in equal manner, the reaction preferably comprises condensation of a compound of formula II with a compound of formula III or IV at a molar ratio of 1:2, i.e., 1 mol of compound II with 2 mols of compound III or IV, or at a ratio varying but slightly from 1:2.

For the production of compounds of formula I, in which at least one of the radicals $R_2$ and $R_3$ differs from the radicals $R_4$ and $R_5$ the condensation may also be carried out according to process c) e.g. in a single operation. It is of advantage to employ the three reaction partners [a compound of formula II, a compound of formula III and a compound of formula IV] at a molar ratio of 1:1:1 or a ratio varying but slightly from it.

During the reactions according to processes a) and c), acyl derivatives, e.g., esters and/or amides presumably always form. The reaction partners and the reaction conditions may be selected in such a way as to first isolate such esters and/or amides and to cyclize them in a second phase to the compounds of formula I. When the reaction is carried out in two separate phases, the first phase (acylation) may be effected at 80°–200°C and in the presence of solvents with respective boiling points ranging from 80° to 180°, for example, benzene, toluene, xylene, chlorobenzene, bromobenzene, ortho-dichlorobenzene. These intermediate products need not be isolated, however, i.e., the reaction conditions are conveniently selected in a way to permit acylation and ring closure in a single operation.

Process b) in which at least one bromine atom is replaced by a cyano group is carried out by reacting the compounds of formula XXI, as defined above, with cuprous cyanide according to known methods.

As examples of suitable functional derivatives of the carboxylic acids of formula II may be given the corresponding carboxylic acid nitriles, carboxylic acid amides (particularly the unsubstituted amide, the mono- or dimethylamide, the ethylamide and the mono- or diethanolamide), carboxylic acid ester and particularly carboxylic acid halides (preferably chlorides). Preferred examples of ester groups are those which are derived from low-molecular aliphatic alcohols, e.g., from methanol or ethyl alcohol. The two functional derivatives on the compounds of formula II may be the same or different.

In the compounds of formula III and IV when X signifies a halogen atom it is preferably chlorine or bromine, with bromine being more preferred.

As examples of 1-amino-2-hydroxybenzenes of formulae III and IV may be given, 1-amino-2-hydroxybenzene, 1-amino-2-hydroxy-alkylbenzenes the alkyl groups of which may be unbranched or branched and may have 1–12 carbon atoms, e.g., 1-amino-2-hydroxy-5-methyl-, -5-tert.butyl- or -5-tert. octylbenzene, 1-amino-2-hydroxy-phenylalkylbenzenes, 1-amino-2-hydroxy-phenylbenzene, 1-amino-2-hydroxy-dialkyl-benzenes, each alkyl radical preferably having not more than 5 carbon atoms, 1-amino-2-hydroxy-chlorobenzene, 1-amino-2-hydroxy-alkoxybenzene, the alkoxy group preferably having not more than 4 carbon atoms, e.g., 1-amino-2-hydroxy-4-methoxy- or -5-methoxybenzene, 1-amino-2-hydroxy-alkyl-alkoxybenzenes, each alkyl or alkoxy radical preferably having not more than 4 carbon atoms, e.g., 1-amino-2-hydroxy-4-methoxy-5-methylbenzene, 1-amino-2-hydroxy-dialkoxybenzenes, each alkoxy group preferably having not more than 4 carbon atoms, e.g., 1-amino-2-hydroxy-4,5-dimethoxybenzene, 1-amino-2-hydroxy-4- or -5-naphthotriazolyl (2')-benzene. Two vicinal positions of the benzene nucleus may also be linked by a —CH=CH—CH=CH— chain, as in 1-amino-2-hydroxy-naphthalene, for example.

As examples of 2-amino-1-halogenbenzene of formula III and IV may be given, the corresponding compounds in which Br occurs instead of OH, also dibromoanilines and tribromoanilines, e.g., 2,4-dibromoaniline and 2,4,6-tri-bromoaniline. The compounds of formula III and IV may be employed as such or in the form of salts, e.g., of chlorine hydrates.

In process d) the reaction of a compound of formula V with a compound of formula VI is conveniently carried out in the absence of air and in the presence of a suitable catalyst such as boric acid, chloride of zinc, arylsulphonic acids, alkali or alkaline earth salts of aryl-sulphonamides, acetic anhydride, alkali acetates, piperidine, alkali or alkaline earth hydroxides, alkali or alkaline earth alcoholates. The reaction is conveniently carried out at temperatures from 0° to 200°C, preferably from 20° to 160°C.

The reaction of the compounds may be effected in the melt, but conveniently in an inert solvent, e.g., aliphatic or aromatic, preferably halogenated hydrocarbons, alcohols, ethers, glycols or formamide, dimethyl formamide or acetamide, N-methylpyrrolidone, acetonitrile, dimethylsulphoxide, tetramethylene, sulphone, hexamethyl phosphortriamidic acid. The process is preferally carried out in the presence of conventional condensation agents or catalysts for such reactions. If required, the group $Z_1$ is subsequently replaced by hydrogen according to known methods.

As examples of functional derivatives of the —CHO groups may be given, oxime, anile ($C_6H_5N=$) and hydrazone.

Isolation of the compounds of formula I may be carried out in various ways, for example, by partial distilling off of the solvent, e.g., under vacuum and with crystallisation, by complete removal of the solvent, e.g., under vacuum or by steam distillation or by dilution with a suitable solvent, e.g., petroleum ether or a low molecular alcohol. The separated compound of formula I is subsequently sucked off, washed and dried.

The present invention still further provides the dicarboxylic acids of formula II and the functional derivatives thereof. The compounds of formula II or the functional derivatives thereof may be produced according

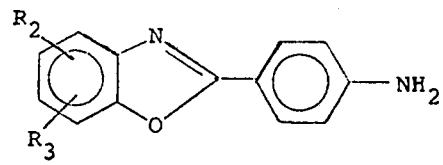

in which $R_2$ and $R_3$ are as defined above, is diazotised and converted to a 2-(p-hydrazinophenyl)-benzoxazole according to known methods e.g., by reaction with isonitrosoacetone, whereupon a compound of formula X,

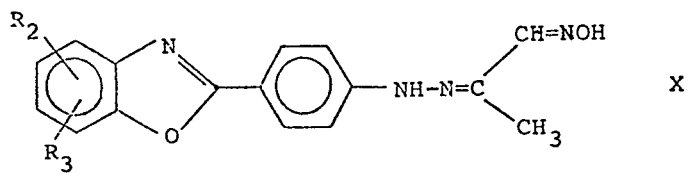

to the Wittig or analogous methods, comprising reacting a compound of formula VII,

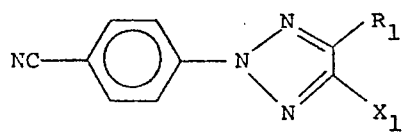

with a compound of formula VIII,

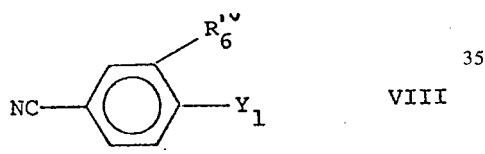

in which $R_1$, $R_6^{iv}$, $X_1$ and $Y_1$ are as defined above, and subsequent hydrolysis of the cyanogen groups in alkaline medium. When $R_6^{iv}$ is Br, the bromine may optionally be replaced by cyano by means of a reaction with cyanogen CuCN according to known methods.

The compounds of formula V wherein $R_1$ is H or Cl may be produced by converting the bromomethyl compounds of formula IX,

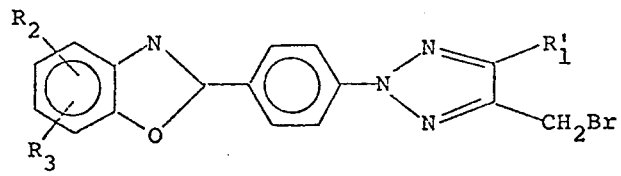

Wherein $R_1{'}$ is H or Cl, and
$R_2$ and $R_3$ are as defined above, to the corresponding aldehydes in accordance with methods known per se (e.g., Sommelet reaction), to nitriles (by reaction with CuCN), to carboxyl derivatives (by hydrolysis of the nitrile compounds), to carbalkoxy derivatives or phosphonates or phosphonium salts (by reaction with phosphites or phosphines, respectively).

The compounds of formula IX wherein $R_1{'}$ is H, may be produced as follows: a 2-(p-aminophenyl)benzoxazole of formula is obtained,
in which $R_2$ and $R_3$ are as defined above.

The compound of formula X may be cyclized e.g., by reacting with acetic acid to yield a compound of formula

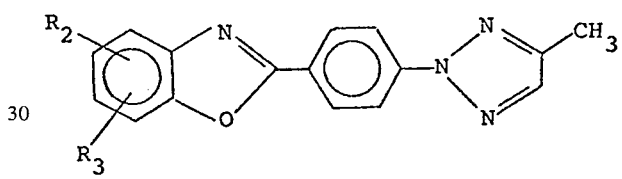

in which $R_2$ and $R_3$ are as defined above, which compound may be converted into a compound of formula IX, where $R_1^i$ is H, employing N-bromosuccinimde.

The compounds of formula IX, wherein $R_1{'}$ is Cl, may be obtained for example, by oxidation cyclisation of a compound of formula X for example, with cupric compounds to yield a compound of formula

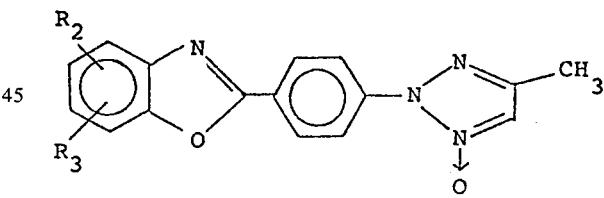

IX in which $R_2$ and $R_3$ are as defined above, followed by reaction with gaseous HCl in a polar solvent to yield a compound of formula

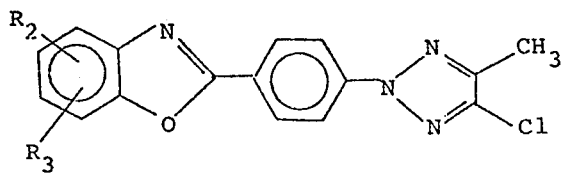

in which $R_2$ and $R_3$ are as defined above, followed by bromination as described above.

The compounds of formula V, wherein $R_1$ is alkyl, may be produced as follows: a compound of formula

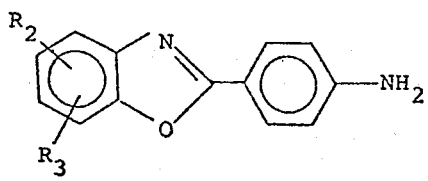

in which $R_2$ and $R_3$ are as defined above, is diazotised and coupled with a derivative of alkanoyl acetic acid. The product is subsequently cyclized, for example with a cupric compound and ammonium acetate, to yield a compound of formula

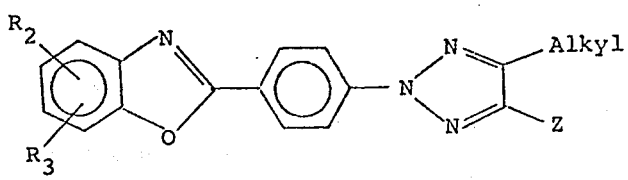

in which $R_2$ and $R_3$ are as defined above, and Z signifies a COO Alkyl, carbonamide or cyano group.

If required, the Z group may be replaced by a $CH_2Z_1$ — group or a CHO-group or a derivative thereof according to known methods.

The compounds of formula XXI, as defined above, may be prepared by a process analogous to process a) or process c) as described above.

The compounds of formula I are useful as optical brighteners.

In particular, they are suitable for optical brightening of plastics or organic materials in fibre, fabric or yarn form. As examples of organic materials may be given synthetic fibre-forming polyesters, polyamides, polyurethanes, polyolefines (polyethylene, propathene), polyvinyl acetate, polyvinyl chloride, polyvinylidene chloride, polyacrylonitrile, modified polyacrylonitrile, cellulose triacetate, —2½-acetate, and polystyrene.

The compounds of formula I, may be applied in conventional manner, for example from solutions or suspensions in organic solvents or from aqueous dispersions. They may also be conveniently incorporated into spinning solutions and melts, plastic moulding materials or added to monomers or prepolymers for the synthesis of polymers. For the application to polyester or blended polyester fabrics it is advantageous to pad these fibres first with an aqueous dispersion of the compound of formula I, with subsquent drying and thermofixation.

The compounds of formula I may be applied in amounts of, for example, from 0.001 to 0.5% based on the weight of the material to be brightened. The compounds may be applied alone or in combination with other optical brighteners, e.g., bluish or greenish fluoroescent whitening agents, if desired, in the presence of surface active agents such as detergents, chemical bleaching agents or carriers.

Finally, the compounds of formula I, may be homogeneously mixed with a carrier material and be employed in this form for brightening.

The following Examples serve to further illustrate the invention. The parts and percentages are by weight, unless otherwise stated, the temperatures are in degrees Centigrade and the parts by volume relate to the parts by weight as millilitres to grams.

EXAMPLE 1

100 Parts 2-phenyl-4-styryl-1,2,3-triazol-4',4''-dicarboxylic acid chloride and 60 parts o-aminophenol are suspended in 750 parts chlorobenzene and kept at 135° with stirring and in the absence of air until the evolution of hydrochloric acid terminates. On cooling to 15°, the precipitate is filtered with suction and washed with methanol. After drying at 60° under vacuum, 130 parts of light yellow o-hydroxy-carbonamide is obtained which is added with 20 parts boric acid to a mixture of 1000 parts diglycol and 400 parts dowtherm and raised to 225° in 2 hours with stirring. This temperature is maintained for 5 hours and the water that forms is distilled off. On cooling to 70°, 300 parts methanol are carefully added, the temperature is raised again to 100° and the methanol and boric acid ester that are formed are distilled off. On cooling to 20°, the light yellow crystals are isolated with suction. 87 Parts of a pale yellow compound are obtained which, recrystallized from o-dichlorobenzene, has a melting point above 360° and agrees with formula $a$,

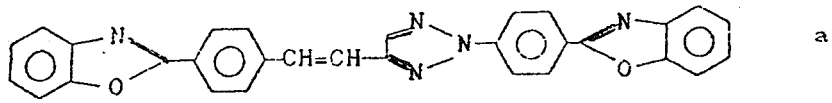

Absorption maximum λ max in trichlorobenzene: 368 nm; ε = 58 000; fluorescence maximum in polyester: 423 nm.

In chlorobenzene solution a violet fluorescence is obtained.

The dicarboxylic acid chloride which is employed as reactant and has not yet been described in the literature, may be produced as follows.

28 Parts methanolic sodium methylate solution (40 %) are added to a mixture of 45 parts p-cyano-benzyl-phosphonic acid diethyl ester, 40 parts 2-[p-cyanophenyl]-4-formyl-1,2,3-triazole and 150 parts freshly distilled dimethyl formamide with stirring at room temperature. Stirring of the reaction mixture is continued for 2 hours and 80 parts methanol are added. The precipitate is isolated with suction and 46 parts of a practically colourless compound are obtained. After recrystallization from o-dichlorobenzene the compound has a melting point of 311°–312° and agrees with formula $b$,

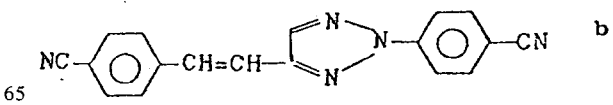

46 Parts of the compound of formula b and 50 parts potassium hydroxide in 250 parts diethylene glycol are stirred at 130° for 12 hours or until the ammonia evolution ceases. On cooling to 10°, the pH is adjusted to 1 with 2 N hydrochloric acid and the product is isolated with suction to yield 49 parts dicarboxylic acid with a melting point > 360°. The product is carefully entered batchwise into 100 parts thionyl chloride without further purification. 1–2 Parts dimethyl formamide are added and the temperature is raised to 70° with stirring. After the conclusion of the vigorous reaction, stirring is continued for another hour and the excess of thionyl chloride is distilled off under vacuum. After recrystallization form toluene, dicarboxylic acid chloride in the form of yellow crystals with a melting point of 153°–155° is obtained. The compound agrees with formula c,

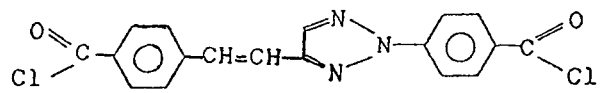

c

EXAMPLE 2

The procedure of Example 1 is followed, but instead of 60 parts 2-aminophenol, 70 parts 2-amino-4-methyl-phenol are employed. 105 Parts of a light, yellow compound are obtained. After recrystallization from chlorobenzene, the compound has a melting point of 318°–320° and agrees with formula d,

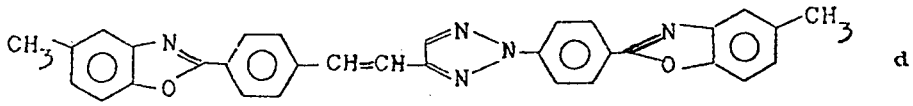

d

Absorption maximum λ max in trichlorobenzene: 362 nm; ε = 60 000.

EXAMPLE 3

The procedure of Example 1 is followed, but instead of 60 parts 2-aminophenol, 75 parts 4-methoxy-2-aminophenol are employed. 92 Parts of a pale yellow compound with a melting point of 299°–301° are obtained. It agrees with formula e, Absorption maximum λ max in trichlorobenzene: 375 nm; fluorescence maximum in polyester: 432 nm.

EXAMPLE 4

The procedure of Example 1 is followed, but instead of 60 parts 2-aminophenol, 86 parts 1-amino-2-hydroxy-naphthalene are employed. 70.5 Parts of a yellow compound with a melting point of 320°–322° are obtained. It agrees with formula f,

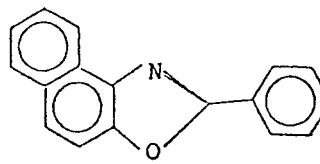
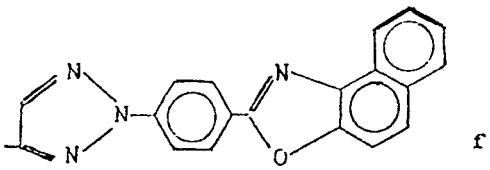

f

Absorption maximum λ max in trichlorobenzene: 385 nm; ε = 6.15 × $10^4$; fluorescence maximum in polyester: 444 nm.

EXAMPLE 5

13 Parts 2-[p-benzoxazolyl-(2′)-phenyl]-4-methyl-vic-triazole-aldehyde (5) are dissolved in 120 parts anhydrous dimethyl formamide to which are added 14.9 parts p-benzoxazolyl-diethoxy-benzyl-phosphonate with stirring in a nitrogen atmosphere. After stirring at room temperature for half an hour, 14 parts of a methanolic sodium methylate solution containing 3.4 parts sodium methylate are added and a temperature of 60° is maintained for 1 hour. On cooling to 10°, the yellow precipitate is filtered, washed with some methanol and recrystallized from trichlorobenzene with the aid of a bleaching earth. Pale yellow crystals with a melting point of 335°–337° are obtained which in chlorobenzene solution show a violet fluorescence and agree with formula g.

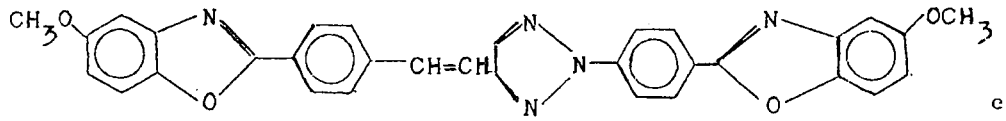

e

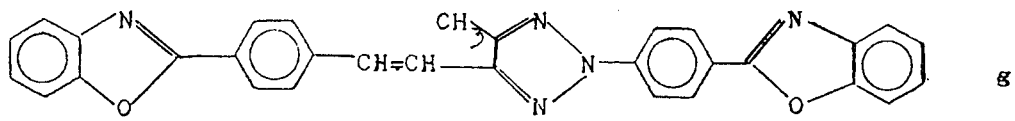

g

Fluorescence maximum in polyester: 435 nm.

The p-benzoxazolyl-methyl-triazole-aldehyde may be synthetized as follows. 139 Parts 4-benzoxazol-(2')-aniline are diazotized in known manner, buffered with sodium acetate and mixed with 86 parts ethyl ester of aceto-acetic acid dissolved in 800 parts ethanol at 0°C. The mixture is stirred for 4 hours at room temperature. After filtration and washing with water, a compound is obtained which agrees with formula h,

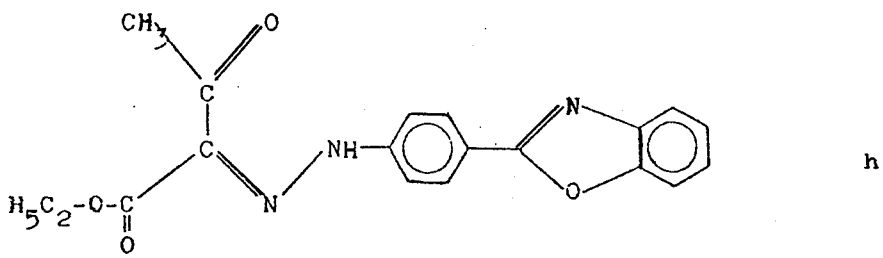

h

70 Parts of this compound, 75 parts cupric chloride, 231 parts ammonium acetate and 800 parts cellosolve are maintained at 110° for 6 hours with stirring. The light yellow triazole compound is filtered with suction. It agrees with formula i,

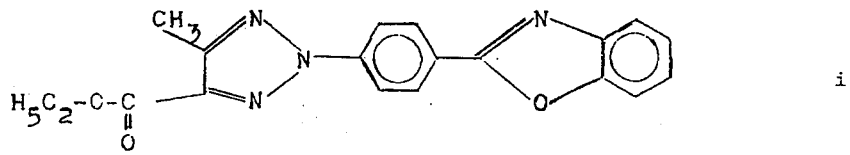

i

35 Parts of this compound, 175 parts 30% soda lye and 175 parts ethanol are maintained at reflux temperature for 5 hours with stirring, poured on icewater and adjusted to an acid pH value with 15% hydrochloric acid. Free carboxylic acid settles out and is filtered with suction and dried. Subsequently, it is kept with 5 times its quantity of thionyl chloride under reflux for 1 hour after which the excess of thionyl chloride is distilled off under vacuum. The carboxylic acid chloride is reduced in dioxane according to Rosenmund-Saizew [J. Chem. Soc. 1962 (No. 5) p. 2024–2029] to an aldehyde of formula j,

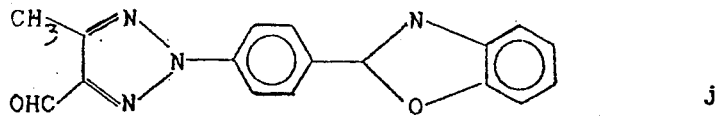

j

After recrystallization from dimethyl formamide its melting point is 306°–308°C.

EXAMPLE 6

32.5 Parts dicarboxylic acid chloride of formula k,

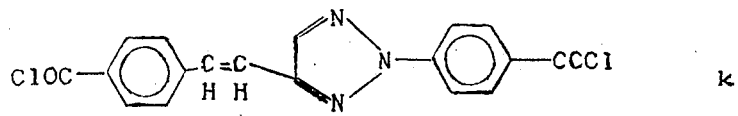

k 66 parts 2,4,6-tribromoaniline and 1200 parts by volume of dry trichlorobenzene in a nitrogen atmosphere are raised to 220° in 1 hour with stirring which is continued for 12 hours at the same temperature. After cooling and filtration the residue is washed with 100 parts by volume of methanol.

A reaction mixture containing 48 parts of the bis-tribromophenyl amide thus obtained, 900 parts by volume of N,N-dimethyl-acetamide, 390 parts by volume of α-picoline, 22 parts cupric acetate and 3.6 parts pulverized zinc is raised to 150° with stirring. The reaction mixture is kept at this temperature for at least 10 hours and subsequently cooled to room temperature. The yellowish precipitate is filtered. Yellow crystals of the bis-(4,6-dibromobenzoxazolyl) compound with a melting point > 300° are obtained. The compound agrees with formula 1,

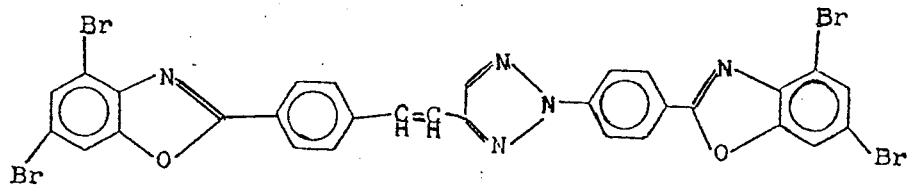

A mixture containing 40 parts of the dibromobenzoxazole compound of formula 1, 22.5 parts cuprous cyanide and 300 parts by volume of quinoline is raised to 210°–230° over a period of 1 hour with thorough stirring and in an inert atmosphere. Stirring is continued at constant temperature for 2 hours, the brown solution cooled to 10°, filtered, and the residue washed first with 100 parts by volume of acetone, then 5 times with 250 parts by volume of aqueous ammonia and finally with

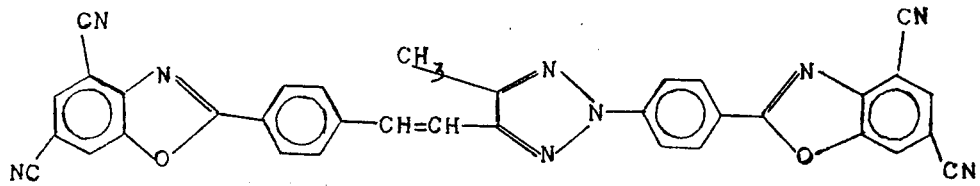

1000 parts by volume of water. After drying under vacuum, light yellow crystals with a melting point > 300° are obtained which show a violet fluorescence in chlorobenzene. They agree with formula m,

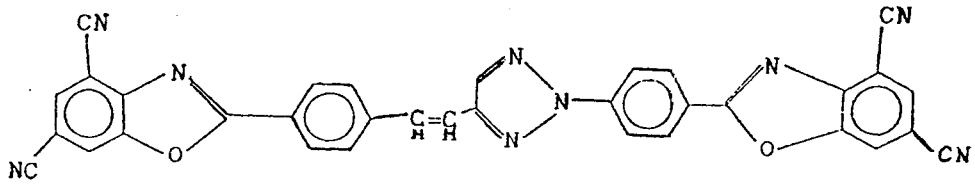

When the procedure of the above Example is followed, but instead of 32.5 parts dicarboxylic acid chloride 33.8 parts of the corresponding 5-methyltriazole compound are employed, a yellow compound of formula n, is obtained which shows a bluish violet fluorescence in chlorobenzene solution.

In the Table below, further compounds which can be produced in accordance with the present invention are listed. They are particularly valuable and agree with formula

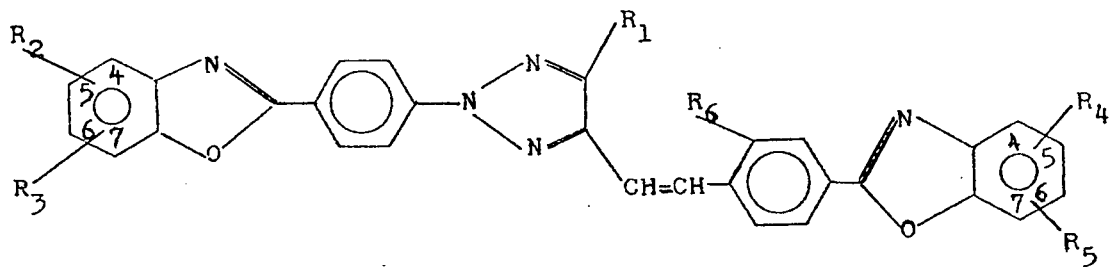

The figures in brackets indicate the position of the substituent on the benzoxazole ring.

TABLE

| Example no. | $R_2$ and $R_4$ | $R_3$ and $R_5$ | $R_1$ | $R_6$ | Fluorescent colour in chlorobenzene solution |
|---|---|---|---|---|---|
| 7 | (6) CH₃O | H | H | H | violet |
| 8 | (6) phenyl | H | H | H | bluish violet |
| 9 | (5) —C(CH₃)₂— phenyl (with CH₃, CH₃) | H | H | H | reddish violet |
| 10 | (5) Cl | H | H | H | reddish violet |
| 11 | (5) phenyl | H | H | H | violet |
| 12 | (5) tert. butyl | H | H | H | slightly reddish violet |
| 13 | (5) CH₃ | (6) CH₃ | H | H | reddish violet |
| 14 | (5) CH₃—C(CH₃)₂—CH₂—C(CH₃)₂— | H | H | H | reddish violet |
| 15 | H | H | H | CN | violet |
| 16 | (6) CH₃O | H | CH₃ | H | bluish violet |
| 17 | (6) phenyl | H | CH₃ | H | blue |
| 18 | (5) —C(CH₃)₂— phenyl | H | CH₃ | H | violet |
| 19 | (5) Cl | H | CH₃ | H | violet |
| 20 | (5) phenyl | H | CH₃ | H | bluish violet |
| 21 | (5) tert. butyl | H | CH₃ | H | violet |
| 22 | (5) CH₃ | (6) CH₃ | CH₃ | H | violet |

TABLE-continued

| Example no. | R₂ and R₄ | R₃ and R₅ | R₁ | R₆ | Fluorescent colour in chlorobenzene solution |
|---|---|---|---|---|---|
| 23 | (5) CH₃—C(CH₃)₂—CH₂—C(CH₃)₂— | H | CH₃ | H | violet |
| 24 | H | H | CH₃ | CN | blue |
| 25 | (6) CN | H | H | H | violet |
| 26 | (4) CN | (6) CN | H | H | violet-blue |
| 27 | (6) naphtho-triazolyl-2* | H | H | H | violet-blue |
| 28 | (5) CH₃O | (6) CH₃O | H | H | reddish violet |
| 29 | (4) CH₃O | (6) CH₃O | H | H | violet |
| 30 | (6) Br | H | H | H | |
| 31 | (5) naphtho-triazolyl-2* | H | H | H | violet |
| 32 | (6) CN | H | CH₃ | H | bluish violet |
| 33 | (6) naphtho-triazolyl-2* | H | CH₃ | H | bluish violet |
| 34 | (5) CH₃O | (6) CH₃O | CH₃ | H | bluish violet |
| 35 | (4) CH₃O | (6) CH₃O | CH₃ | H | violet |
| 36 | (6) Br | H | CH₃ | H | |
| 37 | (5) naphtho-triazolyl-2* | H | CH₃ | H | violet |
| 38 | (5) CH₃ | (6) CH₃O | H | H | reddish violet |

*The naphthotriazolyl-2- radical agrees with formula

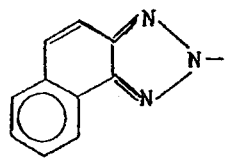

| Ex. no. | R₂ and R₄ | R₃ and R₅ | R₁ | R₆ | Flourescent colour in chlorobenzene solution |
|---|---|---|---|---|---|
| 39 | (5) CH₃ | (6) CH₃O | CH₃ | H | neutral violet blue |
| 40 | (5) CH₃ | H | H | Br | |
| 41 | (5) CH₃ | H | CH₃ | Br | |
| 42 | (6) C₂H₅O | H | H | H | reddish violet |
| 43 | (6) C₂H₅O | H | CH₃ | H | violet |
| 44 | (5) CH₃ | H | H | CN | blue |
| 45 | (5) CH₃ | H | CH₃ | CN | bluish green |

Compounds (30) and (36) may be converted to compounds (25) and (32), respectively, in analogy with the procedure described in Example 6; by the same analogy, compounds (40) and (41) may be reacted to compounds (44) and (45).

The melting points given in the Examples are uncorrected.

APPLICATION EXAMPLE A 500.0 Parts polyamide chips of β-caprolactam, 1.5 parts titanium oxide and 0.1 part of the compound of formula d of Example 2 are intimately mixed in a mixer and subsequently brought to the melt in an autoclave at 250°–260° in the absence of oxygen. The molten mass is pressed through a spinning nozzle with the aid of nitrogen, the filament is allowed to cool, extended to 400% and rolled up on a reel.

The polyamide fibre thus produced possesses a high degree of whiteness. Instead of the compound of formula d of Example 2 the compounds of formulae a or e of Examples 1 and 3 may be employed with equal success.

APPLICATION EXAMPLE B 100.0 Parts polyester granules are powder-coated in a mixer with 0.02 parts of the compound of Example 5 and subjected to injection moulding. Whitened products are obtained. When polyester granules are replaced by granules of other materials such as polyamide, polystyrene, polyethylene, or cellulose acetate, similarly whitened products are obtained. Likewise, when instead of the compound of Example 5 one of the compounds of Examples 1, 2 and 3 is employed, the products obtained are whitened.

APPLICATION EXAMPLE C

100 Parts dimethyl terephthalate, 48.5 parts ethylene glycol and 0.03 parts sodium catalyst are heated at 200° in a pure nitrogen current for 3 hours. 3 Parts brightening agent of Example 1 is added to the polymer.

The low molecular pre-condensate is raised to 280° in 30 minutes, and the temperature is maintained for another 10 hours under vacuum. While the heat transformation is in progress, a slow nitrogen current is passed into the apparatus through a capillary tube. The final product melts at 260° and, in molten form, is extruded into a tape which is cooled by water spraying and is cut into chips. The chips are brought to the melt in the absence of oxygen and water and the melt is spun through nozzles in the conventional way. The fibres thus produced show good brightness.

APPLICATION EXAMPLE D

A woven fabric of polyethylene glycol terephthalate is treated with 0.2 % of the compound of Example 3 in the form of an aqueous dispersion which was produced with the aid of a dispersant, in a padding machine at a liquor ratio of 1:4 for 1½ hours at 120°–125°C. After it is rinsed and dried the sample shows a brilliant violetish whiteness when compared with a corresponding blank.

APPLICATION EXAMPLE E 100.0 Parts of a polyvinyl chloride mass consisting of 65 parts polyvinyl chloride, 35 parts plasticizer, e.g., dioctylphthalate, and 2 % in relation to the polymer of a stabilizer, are mixed with 0.01–0.05 parts of one of the compounds of Examples 1–5 on a roller mill for 3–6 minutes at 165°–185° and subsequently rolled into sheets.

For the production of non-transparent sheets 2.5 % titanium oxide are added to the mass prior to further processing.

What is claimed is:
1. A compound of formula I,

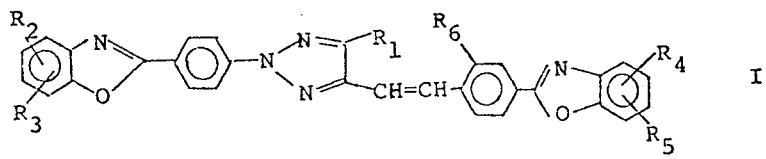

in which $R_1$ is a hydrogen or chlorine atom or a $(C_{1-6})$ alkyl radical, each of $R_2$ and $R_4$, which may be the same or different, is a hydrogen or a chlorine atom, a cyano group, a $(C_{1-12})$ alkyl, phenyl, phenyl $(C_{1-6})$ alkyl, benzyloxy, phenoxy, $(C_{1-6})$ alkoxy or a naphthotriazolyl-2 radical, and each of $R_3$ and $R_5$, which may be the same or different, is a hydrogen atom, a cyano group or a $(C_{1-12})$ alkyl or $(C_{1-6})$ alkoxy radical, or, $R_2$ and $R_3$ together, and/or $R_4$ and $R_5$ together, form a benzene ring, and $R_6$ is a hydrogen atom or a cyano group.

2. A compound according to claim 1, in which, where $R_1$ is an alkyl radical, such radical contains 1 to 4 carbon atoms, where any of $R_2$, $R_3$, $R_4$ and $R_5$ is an alkyl or alkoxy radical, such alkyl radical contains 1 to 8 carbon atoms and such alkoxy radical contains 1 to 4 carbon atoms, and where any of $R_2$ and $R_4$ is a phenylalkyl radical such alkyl moiety contains 1 to 3 carbon atoms.

3. A compound according to claim 1, in which each of $R_2$ and $R_4$, which may be the same or different, is a hydrogen atom, $(C_{1-8})$ alkyl radical, a phenyl radical, a cyano group, a $(C_{1-4})$ alkoxy radical or a naphthotriazolyl-2-radical, and each of $R_3$ and $R_5$, which may be the same or different, is a hydrogen atom, a cyano group, a $(C_{1-8})$ alkyl radical or a $(C_{1-4})$ alkoxy radical and $R_1$ is a hydrogen atom or a $(C_{1-4})$ alkyl radical, and $R_6$ is a hydrogen atom or a cyano group.

4. A compound according to claim 1, in which each of $R_2$ and $R_4$, which may be the same or different is a naphthotriazolyl-2-radical.

5. A compound according to claim 1, in which each of $R_2$ and $R_4$, which may be the same or different, have a significance other than a naphthoriazolyl-2 radical.

6. A compound according to claim 3, of formula I$a$,

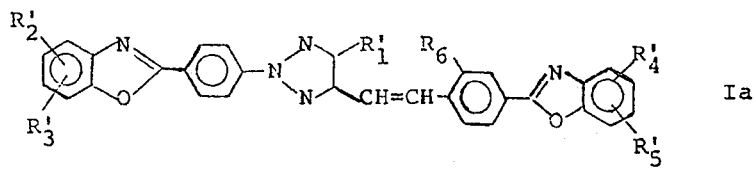

in which $R_6$ is as defined in claim 3,
$R_1'$ is a hydrogen atom or a methyl radical,
each of $R_2'R_3'$, $R_4'$ and $R_5'$, which may be the same or different, is a hydrogen atom, a $(C_{1-8})$ alkyl radical or a cyano group.

7. A compound according to claim 6, in which $R_2'$ and $R_4'$, and $R_3'$ and $R_5'$ respectively, have the same significance.

8. A compound according to claim 3, of formula I$b$,

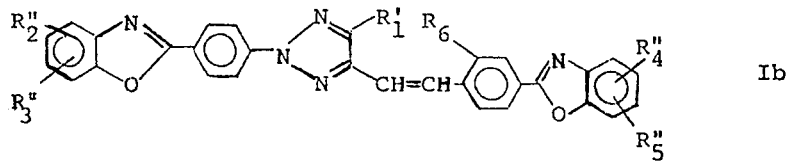

in which $R_6$ is as defined in claim 3,
$R_1'$ is a hydrogen atom or a methyl radical,
one of $R_2''$ and $R_3''$ is a cyano group or a $(C_{1-8})$ alkyl or $(C_{1-4})$ alkoxy radical and the other is a hydrogen atom, and
one of $R_4''$ and $R_5''$ is a cyano group or a $(C_{1-8})$ alkyl or $(C_{1-4})$ alkoxy radical and the other is a hydrogen atom.

9. A compound according to claim 3, of formula I$c$,

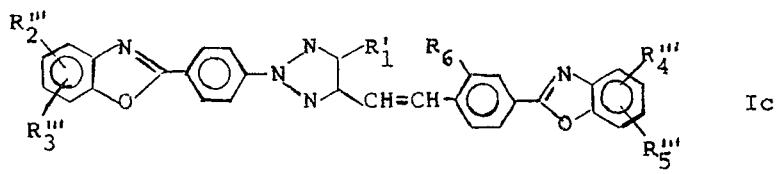

in which $R_6$ is as defined in claim 3,
$R_1'$ is a hydrogen atom, or a methyl radical,
one of $R_2'''$ and $R_3'''$ is a $(C_{1-8})$ alkyl radical, and the other is a $(C_{1-4})$ alkoxy radical,
one of $R_4'''$ and $R_5'''$ is a $(C_{1-8})$ alkyl radical and the other is a $(C_{1-4})$ alkoxy radical.

10. A compound according to claim 8, in which $R_2''$ and $R_4''$ have the same significance and $R_3''$ and $R_5''$ have the same significance.

11. A compound according to claim 9, in which $R_2'''$ and $R_4'''$ have the same significance and $R_3'''$ and $R_5'''$ have the same significance.

12. A compound according to claim 6, in which, where any of $R_2'$ to $R_5'$ is an alkyl radical such alkyl radical contains 1 to 4 carbon atoms.

13. A compound according to claim 8, in which, where any one of $R_2''$ to $R_5''$ is an alkyl radical or alkoxy radical, such alkyl radical contains 1 to 4 carbon atoms and such alkoxy radical contains 1 to 3 carbon atoms.

14. A compound according to claim 9, in which, where any one of $R_2'''$ to $R_5'''$ is an alkyl radical, such alkyl radical contains 1 to 4 carbon atoms and, where any one of $R_2'''$ signifies alkoxy, such alkoxy radical contains 1 to 3 carbon atoms.

15. A compound according to claim 6, in which $R_6$ is a hydrogen atom.

16. A compound according to claim 8, in which $R_6$ is a hydrogen atom.

17. A compound according to claim 9, in which $R_6$ is a hydrogen atom.

18. A compound according to claim 1, in which, where the benzoxazole rings are di-substituted, such substituents are in the 4- and 6-positions.

19. A compound according to claim 1, in which, where the benzoxazole rings are mono substituted such substituent is in the 5- or 6-position.

20. A compound according to claim 1, in which the benzoxazole rings are unsubstituted.

21. A compound according to claim 20 of formula

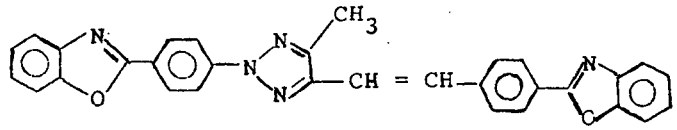

22. A compound according to claim 8, of formula

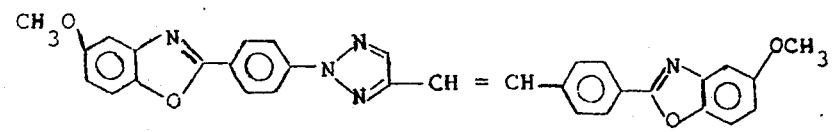

23. A compound according to claim 20, of formula

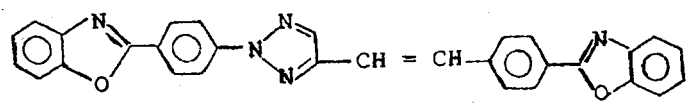

24. A compound according to claim 8, of formula

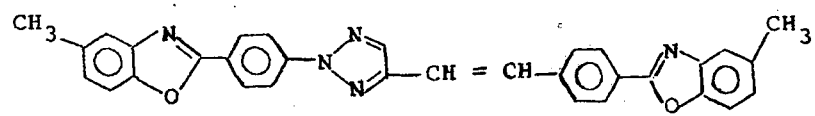

25. A compound according to claim 8, of formula

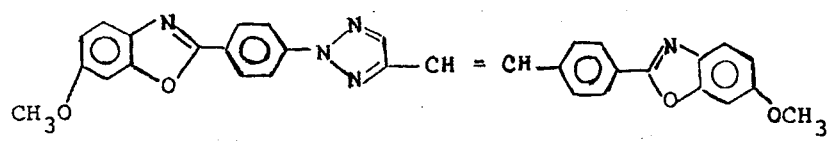

26. A compound according to claim 8, of formula

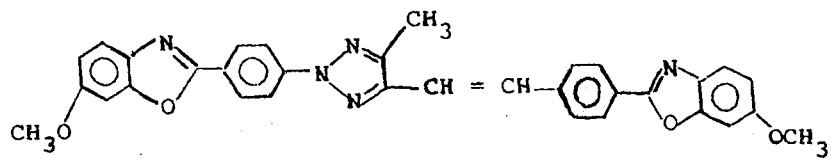

* * * * *